US006015017A

United States Patent [19]

Lauterwald

[11] Patent Number: 6,015,017

[45] Date of Patent: Jan. 18, 2000

[54] ROTARY HAMMER

[75] Inventor: Martin Lauterwald, Frankfurt, Germany

[73] Assignee: Black & Decker Inc., Newark, Del.

[21] Appl. No.: 09/060,395

[22] Filed: Apr. 15, 1998

[30] Foreign Application Priority Data

Apr. 18, 1997 [DE] Germany ........................... 197 17 712

[51] Int. Cl.[7] ........................................ B23B 45/02

[52] U.S. Cl. ........................................ 173/48; 173/109

[58] Field of Search ........................ 173/48, 201, 109, 173/47

[56] References Cited

U.S. PATENT DOCUMENTS

| | | | |
|---|---|---|---|
| Re. 33,733 | 11/1991 | Hendrikx et al. . | |
| 3,774,699 | 11/1973 | Schmuck . | |
| 3,828,863 | 8/1974 | Bleicher et al. | 173/48 |
| 3,837,409 | 9/1974 | Consoli et al. . | |
| 3,874,460 | 4/1975 | Schmid et la. | 173/201 |
| 4,236,588 | 12/1980 | Möldan et al. . | |
| 4,284,148 | 8/1981 | Wanner et al. . | |
| 4,346,767 | 8/1982 | Vaughan . | |
| 4,349,074 | 9/1982 | Ince . | |
| 4,529,044 | 7/1985 | Klueber et al. . | |
| 4,669,551 | 6/1987 | Lippacher et al. . | |
| 4,763,733 | 8/1988 | Neumaier . | |
| 5,052,497 | 10/1991 | Houben et al. . | |
| 5,125,461 | 6/1992 | Höser . | |
| 5,159,986 | 11/1992 | Höser . | |
| 5,277,259 | 1/1994 | Schmid et al. . | |
| 5,320,177 | 6/1994 | Shibata et al. | 173/48 |
| 5,346,023 | 9/1994 | Takagi et al. . | |
| 5,373,905 | 12/1994 | Bleicher et al. . | |
| 5,379,848 | 1/1995 | Rauser . | |
| 5,456,324 | 10/1995 | Takagi et al. . | |
| 5,528,985 | 6/1996 | Haller . | |
| 5,775,440 | 7/1998 | Shinma | 173/201 |

FOREIGN PATENT DOCUMENTS

| | | |
|---|---|---|
| 0759342 | 2/1997 | European Pat. Off. . |
| 2920065 | 11/1980 | Germany . |
| 4202767 | 8/1993 | Germany . |
| 4406841 | 4/1995 | Germany . |
| 4343583 | 6/1995 | Germany . |
| 534036 | 4/1973 | Switzerland . |

*Primary Examiner*—Peter Vo
*Assistant Examiner*—Jim Calve
*Attorney, Agent, or Firm*—Dennis A. Dearing; John D. Del Ponti; Bruce S. Shapiro

[57] ABSTRACT

A rotary hammer comprises an electric motor having its longitudinal axis perpendicular to the axis of the hammer spindle and the tool holder. A single switching element activates and deactivates the hammer mechanism and the rotary drive for the tool holder. The switching element has an eccentric actuating section extending parallel to the main axis of the switching element, acting on a coupling part to activate and deactivate the hammer drive. The switching element has a cam section acting on a slider part to engage and disengage a coupling sleeve (non-rotatable on the hammer spindle) with a drive sleeve to thereby engage and disengage the rotary drive of the hammer spindle.

9 Claims, 10 Drawing Sheets

1'
8
30'
24
17
30
31
25
26
27
29
19
20

8
VI
30'
37
24
41
17
21
16
22
16'
30
8'
7
7'
15
31
13
21
27
VI
28
29
18

ROTARY HAMMER

BACKGROUND OF THE INVENTION

The invention relates to a rotary hammer and, more particularly, relates to a switch for switching between three modes of the hammer, namely, drilling, hammer drilling and chiselling.

Known rotary hammers of this type (German Patent Application P 40 13 512) with switching between more than two operating modes by means of a single switching element are known. In these, there is a parallel arrangement of the axis of the hammer spindle, of the armature shaft of the electric motor and of the intermediate shaft which is driven by armature shaft. In the activated case, the intermediate shaft drives the hammer mechanism and brings about the rotation of the tool holder. All the coupling and uncoupling processes for the activation and deactivation of the rotary drive and of the hammer mechanism therefore take place in one direction, namely parallel to the axis of the hammer spindle, so that the operating mode in question can be set by successive actuation of different coupling arrangements.

In the case of larger rotary hammers in which the drive motor is arranged with its armature shaft at a right angle to the axis of the hammer spindle, it is not at present possible to carry out switching between more than two operating modes, i.e., in addition to switching between activated and deactivated rotary drive or to switching between activated and deactivated hammer mechanism, with a single switching element. Rather, separate switching elements are used. One moves the coupling arrangement for the rotary drive in a direction parallel to the axis of the hammer spindle. This parallel movement generally is directed coaxially relative to the axis of the hammer spindle. The other switching element displaces the coupling arrangement for the activation and deactivation of the hammer mechanism parallel or coaxially relative to the armature shaft.

SUMMARY OF THE INVENTION

An object of the invention is to simplify the structure of a rotary hammer in which the armature shaft of the electric motor is arranged perpendicular to the axis of the rotary hammer spindle by making it possible for switching between at least three operating modes to be effected with a single switching element.

To achieve this object, a rotary hammer has armature shaft of the electric motor perpendicular to the axis of the hammer spindle. The armature shaft can selectively be coupled with drive shaft for the hammer mechanism. Also, the armature shaft drives a drive sleeve shaft which is rotatably arranged on the hammer spindle and can be coupled with the hammer spindle via a coupling sleeve which is non-rotatable but axially displaceable on the hammer spindle. A switching element rotatable from outside the housing about a main axis engages and disengages the armature shaft and the drive shaft and engages and disengages the drive sleeve and the coupling sleeve to switch between at least a first pure drilling mode, a second hammer drilling mode and a third chiselling mode.

Preferably, to engage and disengage the drive sleeve and the coupling sleeve, the switching element has a cam section which acts on the coupling sleeve via a slider part movable parallel to the axis of the hammer spindle so that the coupling sleeve can be moved into and out of engagement with the drive sleeve. The slider part is arranged between the coupling sleeve and the switching element, so that switching is made possible through action on the slider part at a distance from the actual coupling arrangement for the rotary drive. Accordingly, the slider part can be displaced parallel to the axis of the hammer spindle by the cam section provided at the switching element. In this way, the movement of the coupling sleeve is brought about in the manner that is usual per se parallel or coaxially relative to the axis of the hammer spindle.

Preferably, to connect and disconnect the armature shaft to the hammer mechanism drive shaft, an actuating section is eccentrically connected to the switching element relative to the main axis and positions a coupling part coaxially movable relative to the drive shaft. The activation and deactivation of the rotary drive of a rotary hammer through displacement of a coupling part on the hammer spindle is customary in rotary hammers of the type concerned (U.S. Pat. No. 4,236,588). However, the associated switching element is situated in the immediate vicinity of the coupling part and has an eccentric pin engaged in an annular groove of the coupling part for axially displacing the coupling part upon rotation of the switching element.

To operate the hammer in a drill mode or hammer drill mode, the coupling sleeve in a withdrawn position may be in positive engagement with the drive sleeve to rotate the drive sleeve and thus the hammer spindle and the tool holder. To operate the hammer in a chiselling mode, the coupling sleeve in an advanced position can be positive engagement with a housing-fixed zone to secure the hammer spindle against rotation in the chisel mode. The coupling sleeve is expediently spring-loaded in the direction of the withdrawn position to bias the drive teeth of the coupling sleeve into driving engagement with the drive sleeve if the teeth of the coupling and drive sleeves are initially misaligned.

To actuate the coupling sleeve, the cam section of the switching element preferably has a cam surface running spirally around the main axis of the switching element. The rear end of the slider part rests on the cam surface. The front end of the slider part is fork-shaped and engages a support surface of the coupling sleeve for displacing the coupling sleeve into its advanced position. As a result, the loading of the coupling sleeve is uniform on those sides and tipping of the slider can be avoided.

The slider part may be spring-loaded in the direction of the advanced position of the coupling sleeve. As a result if the teeth of the coupling sleeve and housing-fixed zone are misaligned during the switching process, the coupling sleeve and housing fixed zone are biased into engagement when the coupling sleeve is rotated relative to the housing-fixed zone.

The coupling part for activation and deactivation of the hammer mechanism may be spring-loaded in the direction of the coupling with the drive shaft. It may consist of a sleeve which is non-rotatable but axially displaceable on the drive shaft and which has a radially outwardly directed flange. To displace coupling part, the actuating section (eccentrically mounted relative to the main axis of the switching element) engages the flange when the switching element is rotated.

DESCRIPTION OF THE DRAWINGS

The invention is explained in more detail below with reference to the drawings which show an embodiment.

DESCRIPTION OF THE PREFERRED EMBODIMENT

Figure 1:
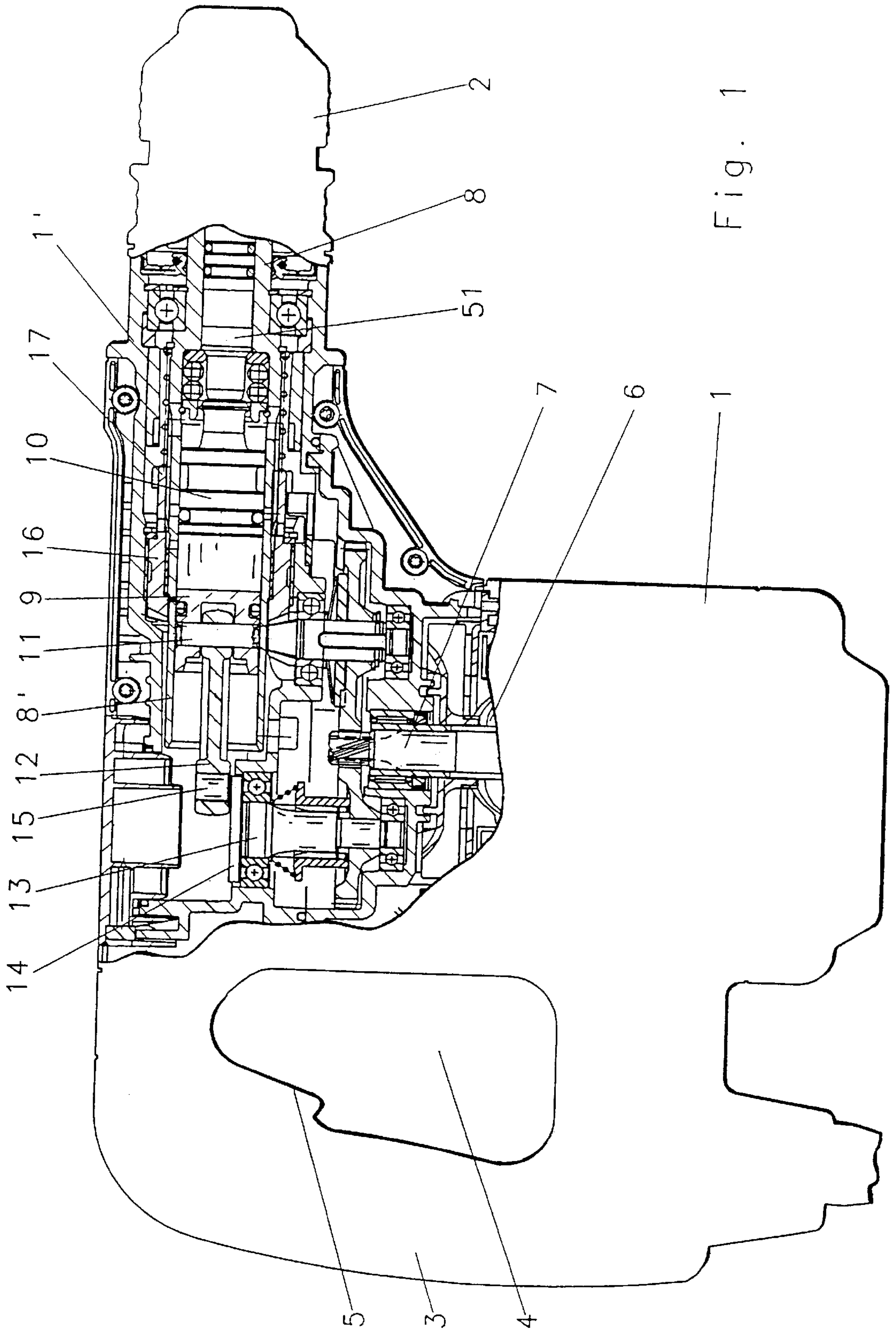
FIG. 1 shows, partly broken open and in section, a rotary hammer.

The represented rotary hammer has a hammer housing 1 made up in the usual way of several components. A gripping portion 3 is formed at rear end of the housing. A conventional switch actuator 5 for switching for electric motor 6 on and off projects into a grip opening 4 from the rear side of the gripping portion 3. In the rear lower portion of the hammer housing 1, a mains lead is provided for connecting the hammer to a power source.

Located in the upper portion of the rotary hammer in FIG. 1 is an inner housing 1' formed of half-shells and made preferably from cast aluminium or the like. An inner housing 1' extends forwards out of the rotary hammer housing 1. A hammer spindle 8 is rotatably supported in the inner housing 1'. The rear end of spindle 8 forms a guide tube 8' provided in known manner with vent apertures for a pneumatic hammer mechanism. A tool holder 2 is attached to the front end of spindle 8. The hammer mechanism contains a piston 9 which is coupled, via a trunnion 11 and a crank arm 12, with a crank pin 15 eccentrically mounted on an upper plate-shaped end 14 of a drive shaft 13. Reciprocating movement of the piston 9 alternately creates a vacuum and an over-pressure in front of the piston to move a ram 10 situated in the guide tube 8' correspondingly. This transmits impacts onto the beat piece 51 and in turn to the rear end of a hammer bit or chisel bit, not represented, in tool holder 2. This mode of operation and the structure of a pneumatic hammer mechanism are, as already mentioned, known and will, therefore, not be explained in more detail.

The electric motor 6 is arranged in the hammer housing 1 in such a way that its armature shaft 7 extends perpendicular to the longitudinal axis of the hammer spindle 8 and the tool holder 2. Also, the longitudinal axis of the armature shaft 7 preferably lies in a plane with the longitudinal axis of the hammer spindle 8 and tool holder 2. To drive the hammer mechanism, at the upper end of the armature shaft 7 in FIG. 1, a pinion 7' meshes with a gear wheel 18 rotatably mounted on the drive shaft 13. The pinion 7' also meshes with a gear wheel 21 located on the side of the armature shaft 7 lying opposite the drive shaft 13 and non-rotatably secured on a shaft 22 rotatably housed in the housing 1'. At the upper end of the shaft 22, a bevel gear meshes with the bevel teeth 16' of a drive sleeve 16. Drive sleeve 16 is rotatably mounted, via a schematically indicated friction bearing, but axially nondisplaceable on the hammer spindle 8 or on its rear part forming the guide tube 8' of the hammer mechanism. A coupling sleeve 17 is axially displaceable but non-rotatable on spindle 8 in front of drive sleeve 16 as a result of engagement with a splined section on the outer surface of the hammer spindle 8. Coupling sleeve 17 can be displaced between a position in positive engagement, via teeth or projections formed at its rear end, with corresponding teeth or projections at the front end of the drive sleeve 16, and a forwardly displaced position disengaged with drive sleeve 16. A helical spring 30' loads the coupling sleeve 17 in the direction of the drive sleeve 16. The spring loading causes the coupling sleeve to be biased into driving engagement with the drive sleeve 16. If the driving engagement is initially blocked by abutment of the end faces of the projections or teeth of the coupling sleeve 17 against the end face of the projections or teeth of the drive sleeve 16, a positive driving engagement is then automatically established when there is a relative rotation of the coupling sleeve 17 and the drive sleeve 16 due, for example, to rotation of the drive sleeve 16 by shaft 22.

Thus, rotation of the armature shaft 7 via the gear wheel 21 and the bevel teeth 23 of the shaft 22 causes rotation of the drive sleeve 16. And, when there is a positive engagement between drive sleeve 16 and the coupling sleeve 17, the hammer spindle 8 and the tool holder 2 are rotated. Accordingly, in the absence of a positive engagement between the drive sleeve 16 and the coupling sleeve 17, the hammer spindle 8 is not rotated despite rotation of the drive sleeve 16. If the coupling sleeve 17 with protrusions at the front end projecting radially outwards enter into a positive engagement with corresponding recesses in the housing-fixed zone 24, the coupling sleeve 17 and thus of the hammer spindle 8 including the tool holder 2 are locked against rotation. This mode of operation of the coupling sleeve 17 is known.

To drive the hammer mechanism, the gear wheel 18 driven by the pinion 7' of the armature shaft 7 is coupled with the drive shaft 13 in a manner yet to be described. And the crank pin 15 performs a circular movement which creates, via the crank arm 12, the reciprocating movement of the piston 9 in the guide tube 8' of the hammer mechanism. This type of drive is also known in rotary hammers in which the armature shaft 7 of the drive motor 6 lies perpendicular to the longitudinal axis of the hammer spindle 8 and the tool holder 2.

To switch between the individual operating modes of the rotary hammer, the hammer has a single switching element 25 rotatable about a main axis 26. From the outside of the housing 1 an actuation button, not represented, is secured to the switching element 25 and is accessible to the user. On its inside the switching element 25 has a cam section 27 with a cam surface 28 running spirally around the main axis 26. Cam surface 28 extends over an angle range of roughly 210°. And, the ends of the cam surface are connected by a rectilinear section. Projecting from the inner end of the switching element 25 is a laterally spaced rod- or pin-shaped actuating section 29 extending parallel to the main axis 26.

Figure 2:
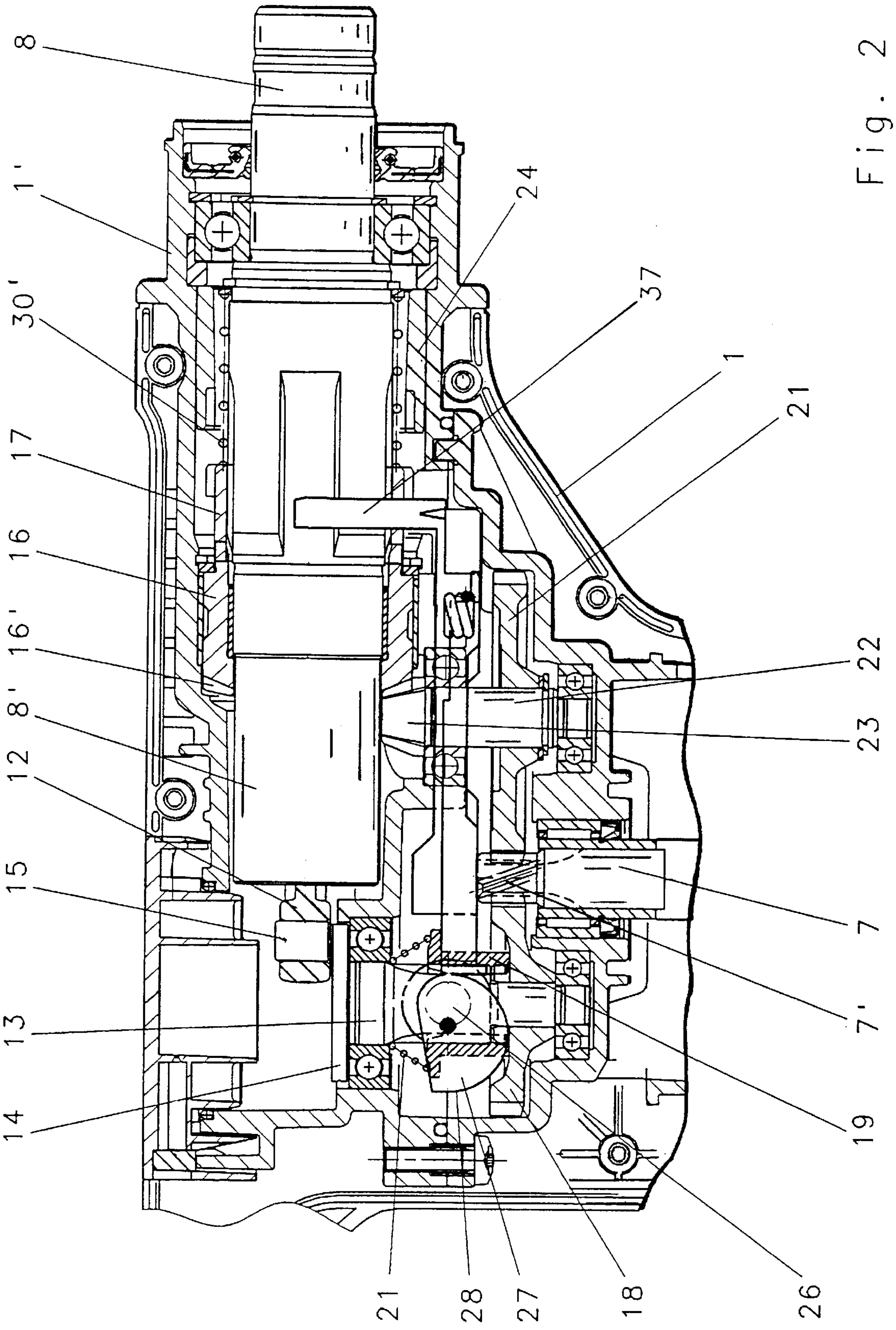
FIG. 2 shows, partly in section, partly as a view, a portion of the rotary hammer from FIG. 1.
Figure 3:
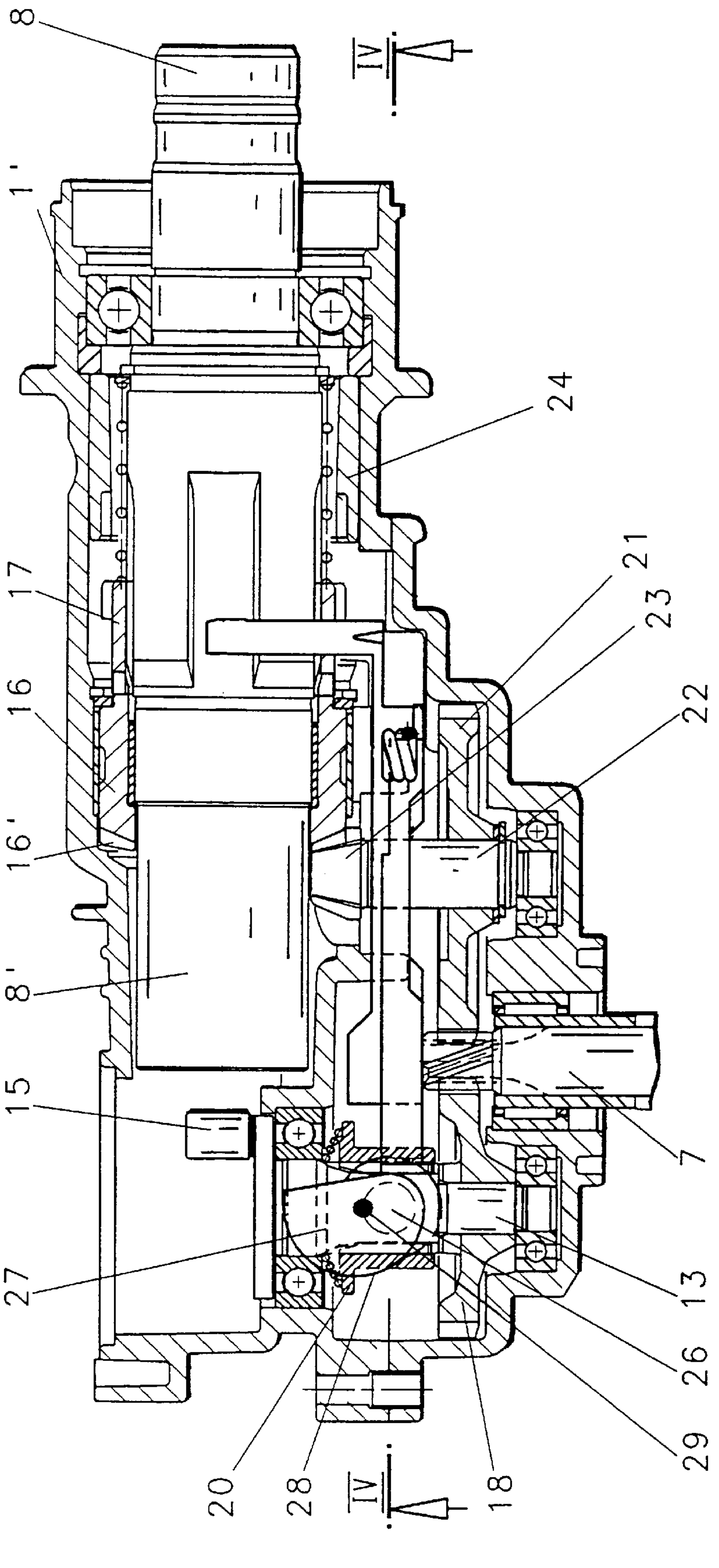
FIG. 3 shows, partly in section and partially as a view, the portion of the rotary hammer from FIGS. 1 and 2 around the hammer spindle in an operating position for pure drilling.

A sleeve-shaped coupling part 19 is non-rotatably mounted (through engagement with a splined section) but axially displaceable on the drive shaft 13 and has an annular flange 20 at its upper end in FIGS. 1 to 3. A spring 21 has its upper end against the inner race of a ball bearing rotatably housing the drive shaft 13 and has its lower end engaging the annular flange 20. The spring force is directed downwards, i.e, in the direction of the gear wheel 18, and acts permanently on the part 19. At the lower end, the part 19 has projections or teeth, not represented. In the lower position of the sleeve 19 shown in FIGS. 2, 5, 7 and 9, the teeth are in positive engagement with corresponding recesses in the body of the gear wheel 18. In this position, rotation of the gear wheel 18 rotates the drive shaft 13 which is in positive engagement with the part 19.

Figure 5:
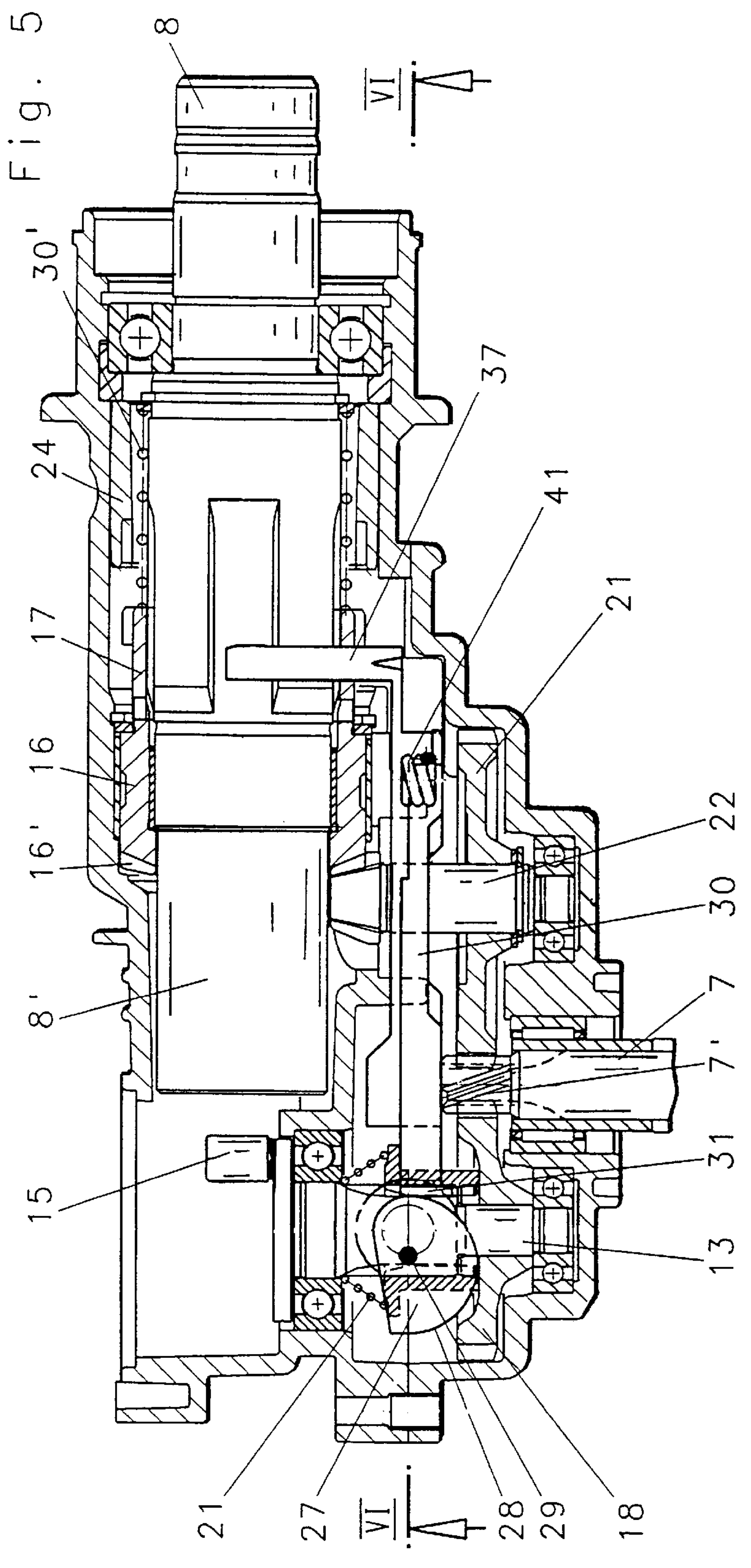
FIG. 5 shows, in a representation corresponding to FIG. 3, the rotary hammer in the operating position for hammer drilling.
Figure 6:
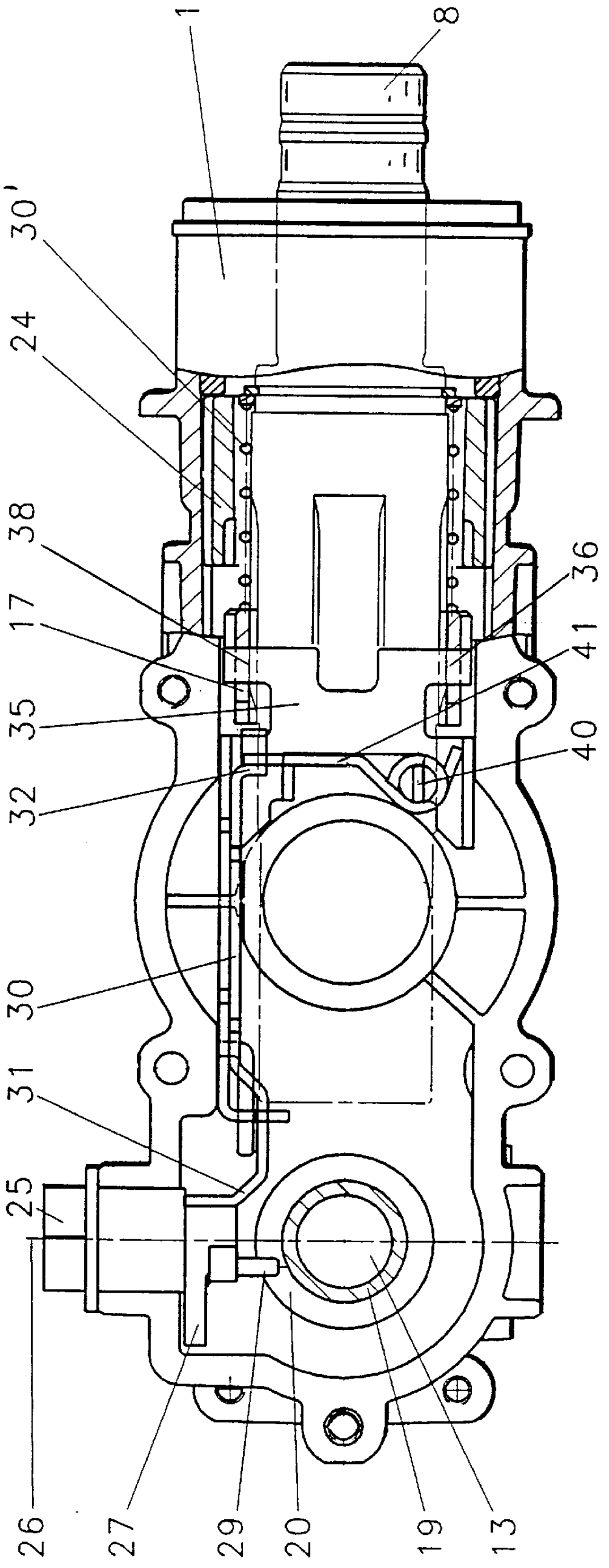
FIG. 6 shows, in a representation corresponding to FIG. 4, a section along the line VI—VI from FIG. 5.
Figure 7:
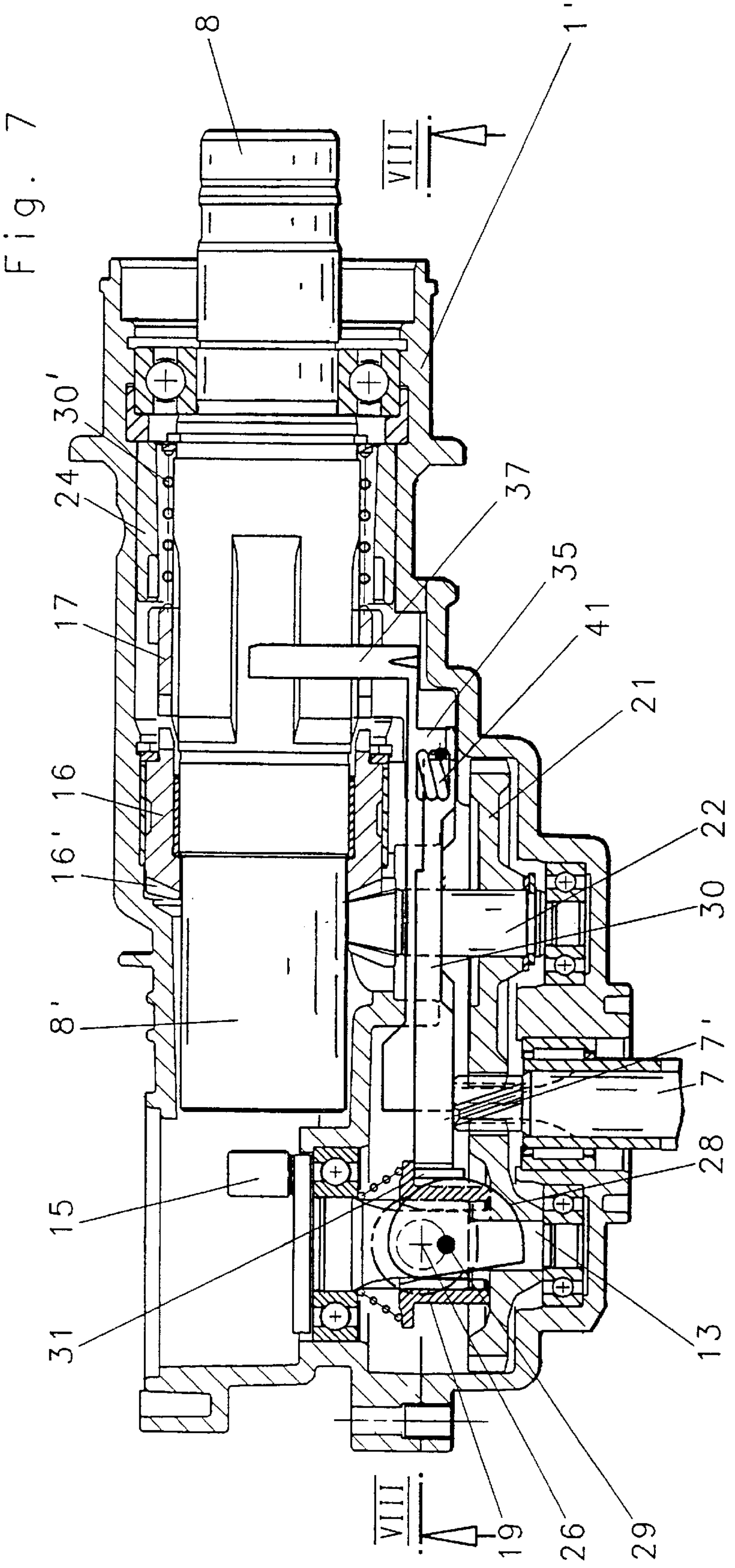
FIG. 7 shows, in a representation corresponding to FIGS. 3 and 5, the rotary hammer in the chiselling position with the hammer spindle unlocked.
Figure 8:
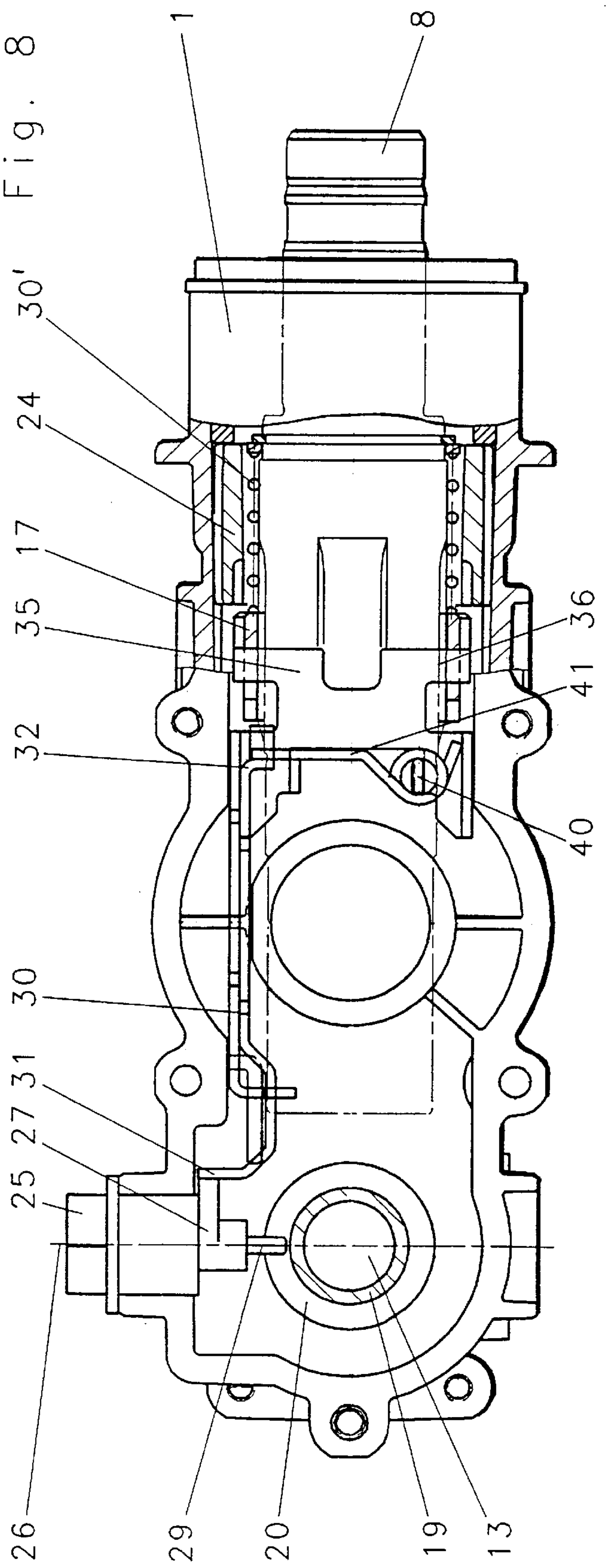
FIG. 8 shows a section along the line VIII—VIII from FIG. 7 in a representation corresponding to FIGS. 4 and 6.
Figure 9:
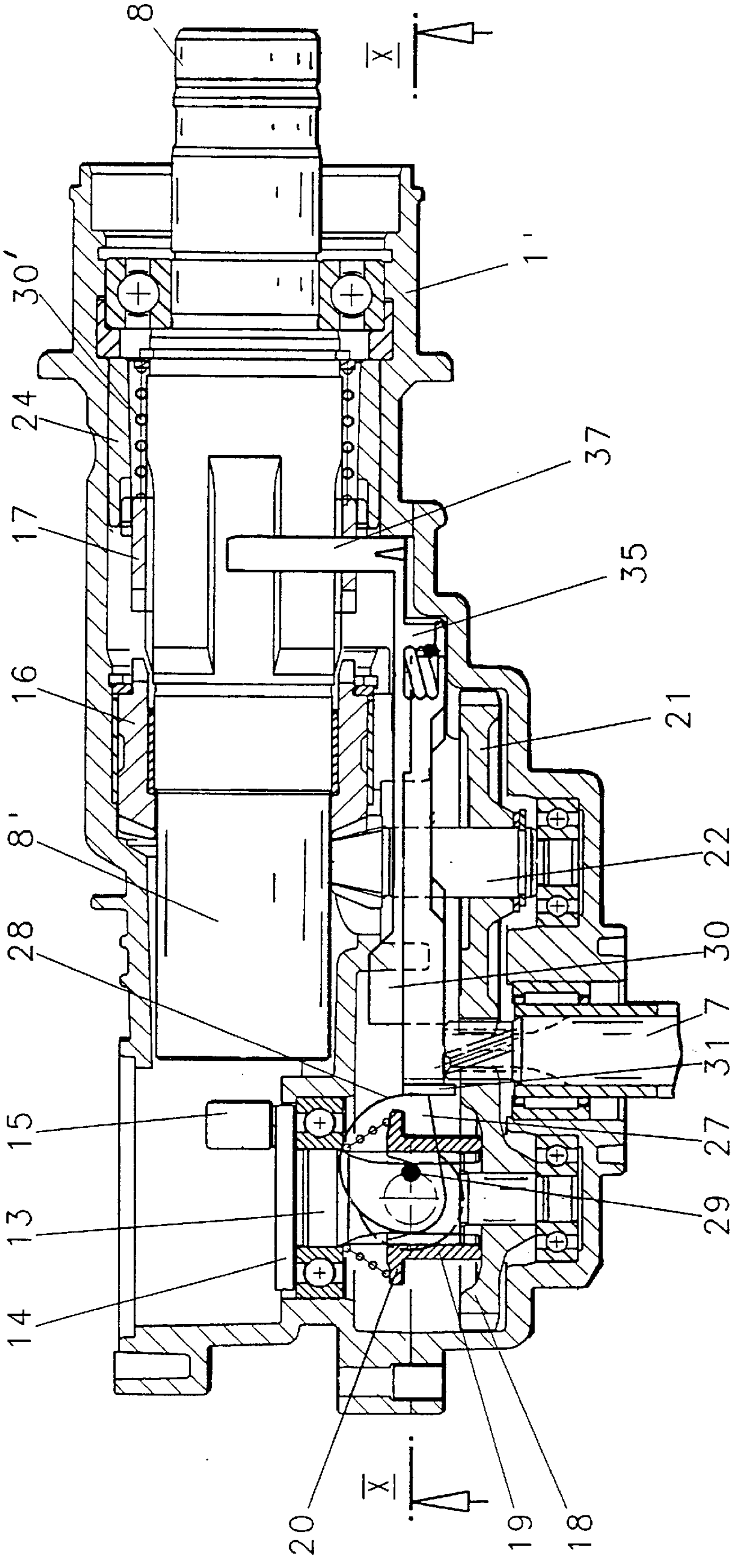
FIG. 9 shows, in a representation corresponding to FIGS. 3, 5 and 7, the rotary hammer in the chiselling position with the hammer spindle locked.
Figure 10:
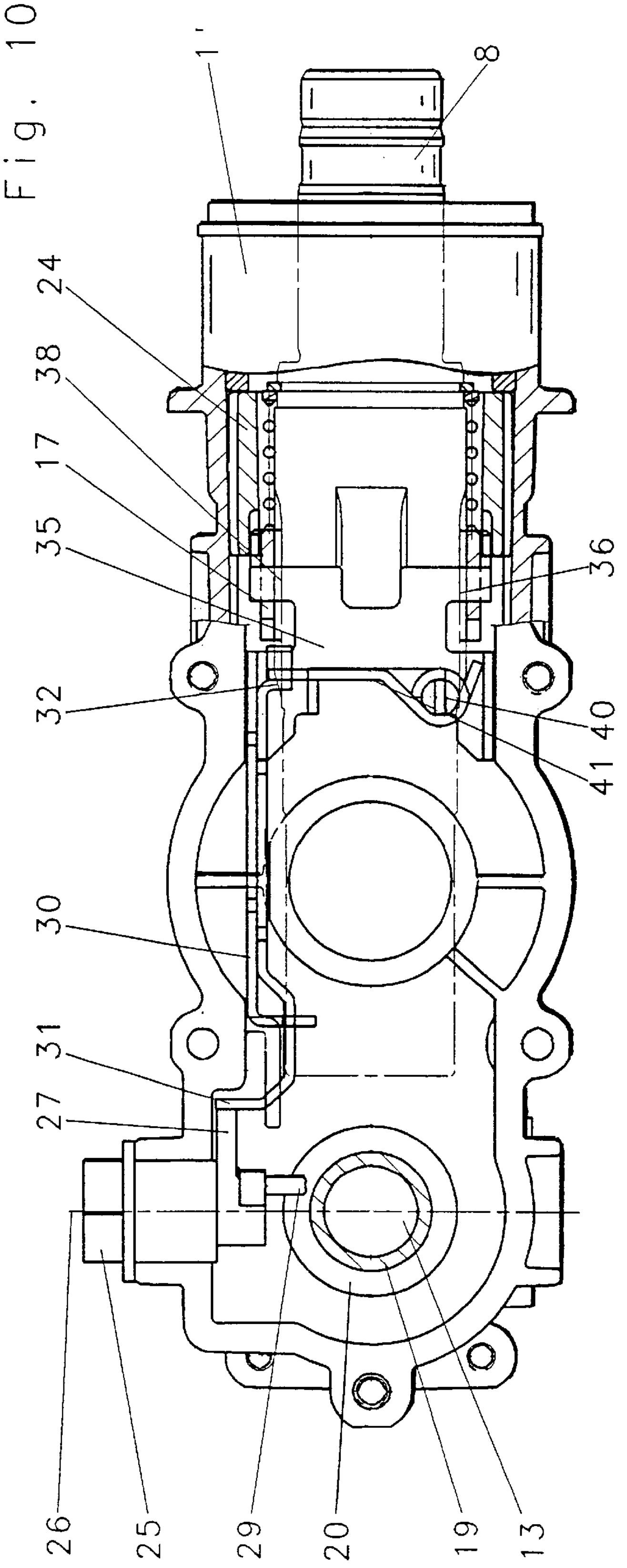
FIG. 10 shows a section along the line X—X from FIG. 9 in a representation corresponding to FIGS. 4, 6 and 8.

The rod- or pin-shaped actuating section 29 on the switch element 25 extends into the area below the flange 20 of the sleeve 19. And, upon rotation of the switching element 25 about its main axis 26, as shown in FIGS. 5, 7 and 9, section 29 is moved about same on a semicircle which, when the part 19 is in the lower position, lies below the flange 20. In all these positions, the part 19 is therefore in positive engagement with the gear wheel 18. Thus, upon rotation of the armature shaft 7, the hammer mechanism is driven as a result of the circular movement of the crank pin 15. However, if the switching element 25 is twisted clockwise out of the position in FIG. 5 or counterclockwise out of the position in FIG. 9, actuating section 29 engages the lower surface of the flange 20 and raises part 19 against the force of the spring 21 out of driving engagement with the gear wheel 18. In this position, shown in FIG. 3, the hammer mechanism is not driven when the gear wheel 18 is driven, i.e., the rotary hammer operates in a pure drilling mode.

To change the aforementioned position of the coupling sleeve 17 (non-rotatably, but axially displaceable on the hammer spindle 8) a slider part is provided which consists of a connection section 30 and an engagement section 35, which are guided in projections (not shown) of housing 1. At one end, the connection section 30 has a bent part 31 engaging the cam surface 28 of the cam section 27 of the switching element 25. One end of a spring 41 engages the opposite bent end 32. The other end of spring 41 rests against the sidewall of engagement section 35 and is attached to a pin on engagement section 35. Spring 41 is stiffer than the spring 30' acting on the coupling sleeve 17. And thus, if the sections 30, 35 are displaced relative to each other spring 41 creates between connection section 30 and engagement section 35 a force biasing connection section 30 rearwardly toward cam surface 28 and the engagement section 35 forwardly toward the front end of the spindle 8. Engagement section 35 has legs 37 (only one shown) extending on both sides of the hammer spindle 8 and formed at lateral projections 36, 38. Thus, the engagement section 35 has an essentially U-shaped cross-section in this area. The legs 37 extend upwards from the essentially level engagement segment of section 35 above the level of the longitudinal axis of the hammer spindle 8, as is shown in FIGS. 2, 3, 5, 7 and 9.

Figure 4:
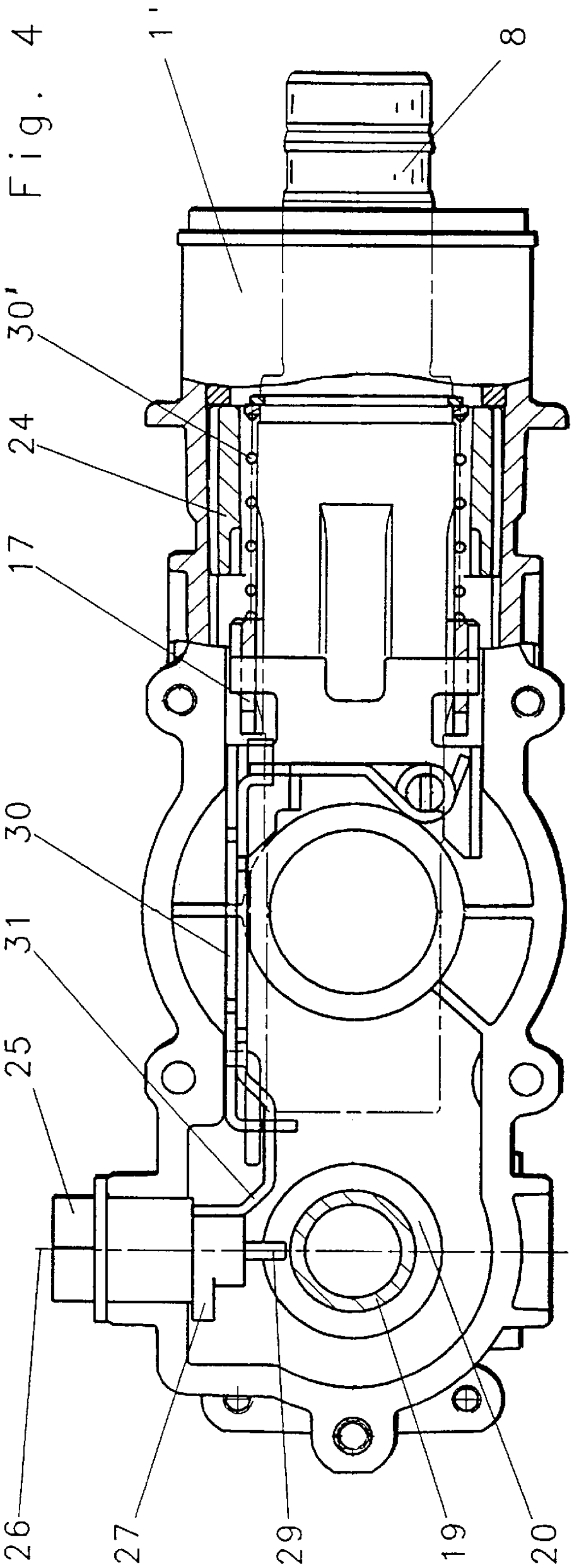
FIG. 4 shows a section along the line IV—IV from FIG. 3, a part of the rotary hammer being represented as a view.

Rotation of the switching element 25 causes, in addition to the movement explained above of the rod- or pin-shaped actuating section 9, a displacement of the slider part 30, 35 as a result of the changing distance of the cam surface 28 from the main axis 26 of the switching element 25. In the drilling mode shown in FIGS. 3 and 4, bent part 31 of the connection section 30 lies against a zone of the cam surface 28 which is at a minimum distance from the main axis 26, whereby the coupling sleeve 17 is pressed by spring 30 into positive engagement with the drive sleeve 16. And the hammer spindle 8 is driven rotationally upon rotation of the armature shaft 7. Since, in this operating mode, the rod- or pin-shaped actuating section 29 has raised the coupling part 19 out of positive engagement with the gear wheel 18 and therefore the hammer mechanism is not driven, this is the pure drilling mode.

To provide the rotary hammering mode, if the switching element 25 is twisted clockwise out of the position in FIG. 3 into the position in FIG. 5, coupling part 19 is lowered into positive engagement with the gear wheel 18 and therefore in a position for driving of the hammer mechanism. Because the cam surface 28 is not changing its distance from the main axis 26, the position of the bent part 31 and thus of the slider part 30, 35 remains unchanged. In operation, therefore, the hammer mechanism is driven and the hammer spindle 8 is rotated to provide the rotary hammering mode.

To provide the hammering or chiselling mode, if the switching element 25 is rotated further clockwise out of the position in FIG. 5 into the position in FIG. 7, the drive for the hammer mechanism remains activated. But there is a forward displacement of the bent part 31 and thus of the slider part 30, 35. The legs 37 of the engagement section 35 rest against the rear surfaces of the teeth or projections protruding radially outwards at the front end of the coupling sleeve 17. And thereby, coupling sleeve 17 is displaced and is disengaged from drive sleeve 16. Thus, the drive for the rotation of the hammer spindle 8 is disengaged. However, since there is still no positive engagement between the recesses in the housing fixed zone 24 and the projections or teeth at the front end of the coupling sleeve 17, the hammer spindle 8 is not yet secured against nondriven rotation. The rotary hammer is now in the operating mode for hammering or chiselling with the hammer spindle 8 unlocked.

Further rotation of the switching element 25 clockwise out of the position in FIG. 7 into the position in FIG. 9 does not change position of the sleeve 19, so that the hammer mechanism remains activated. However, since the radial distance of the cam surface 28 of the cam element 27 from the switching element 25 increases further, the slider part 30, 35 is displaced further forward. This results in a further forward displacement of the coupling sleeve 17. And, the teeth or projections protruding radially outwards at its front end enter into positive engagement with the corresponding recesses in the housing-fixed zone 24. Thus, hammer spindle 8 is locked against rotation. Coupling sleeve 17 is loaded by spring 41 forwardly into engagement with zone 24. Accordingly, if the end faces of the teeth of coupling sleeve 17 and zone 24 are initially abutted preventing full engagement, the coupling sleeve 17 is fully engaged with zone 24 when the coupling sleeve 17 and zone 24 are relatively rotated. The rotary hammer is now in the chiselling mode with the hammer spindle 8 locked.

What is claimed is:

1. A rotary hammer comprising:

a hammer housing having front and rear ends;

a hammer spindle rotatably mounted in the housing for rotation about an axis;

a drive sleeve rotatably mounted on the hammer spindle;

a coupling sleeve is non-rotatable but axially displaceably mounted on the hammer spindle to rotate therwith and couplable to the drive sleeve;

a motor having an armature shaft extending perpendicular to the hammer spindle axis;

a tool holder for receiving a bit, the holder located at the front end of the hammer housing and rotatably drivable by the motor about the hammer spindle axis;

a hammer mechanism in the hammer housing for generating impacts acting on a rear end of the bit and having a drive shaft;

the armature shaft being selectively coupled with the hammer mechanism drive shaft for generating impacts and being selectively coupled with the coupling sleeve via the drive sleeve for driving the hammer spindle;

a switching element rotatable about a main axis and having a cam section for switching between at least a first pure drilling mode, a second hammer drilling mode and a third chiseling mode;

a slider part movable parallel to the axis of the hammer spindle;

the cam section acting on the coupling sleeve via the slider part to move the coupling sleeve between a position engaged with the drive sleeve and a release position separated from the drive sleeve;

a coupling part coaxially movable relative to the drive shaft between a first and second position engaging and disengaging, respectively, a drive connection between the armature shaft and the drive shaft; and an actuating section connected to the switching element eccentrically relative to the main axis for moving the coupling part between the first and second positions.

2. The rotary hammer of claim 1 wherein:

in said first position, the coupling sleeve is in positive engagement with the drive sleeve and, in said second position, is in positive engagement with a housing-fixed zone; and the coupling sleeve is spring-loaded in the direction of the withdrawn position.

3. The rotary hammer of claim 2 wherein the slider part is spring-loaded in the direction of the advanced position of the coupling sleeve.

4. The rotary hammer of claim 1 wherein:

the cam section has a cam surface running spirally around the main axis of the switching element;

the rear end of the slider part rests on the cam surface; and the front end of the slider part is fork-shaped and engages a support surface of the coupling sleeve for displacing the coupling sleeve into its advanced position.

5. The rotary hammer of claim 1 wherein the coupling part is spring-loaded in the direction of coupling with the drive shaft.

6. The rotary hammer of claim 1 wherein:

coupling part comprises a sleeve non-rotatable but axially displaceable on the drive shaft and has a radially outwardly directed flange; and the actuating section of the switching element is engageable the flange to displace the sleeve-shaped coupling part.

7. A rotary hammer comprising:

a hammer housing having front and rear ends;

a hammer spindle rotatably mounted in the housing for rotation about an axis;

a drive sleeve rotatably mounted on the hammer spindle and drivable by an armature shaft;

a coupling sleeve non-rotatable but axially displaceable mounted on the hammer spindle to rotate therewith and couplable to the drive sleeve;

a motor having said armature shaft extending perpendicular to the hammer spindle axis;

a tool holder for receiving a bit, the holder located at the front end of the hammer housing and rotatably drivable by the motor about the hammer spindle axis;

a hammer mechanism in the hammer housing for generating impacts acting on a rear end of the bit and having a drive shaft;

the armature shaft being selectively coupled with the hammer mechanism drive shaft for generating impacts and being selectively coupled with the coupling sleeve via the drive sleeve for driving the hammer spindle;

a slider part; and a switching element rotatable from the outside the housing about a main axis for engaging and disengaging the armature shaft and the drive shaft and for engaging and disengaging the drive sleeve and the coupling sleeve via the slider part to switch said tool holder between at least a first pure drilling mode, a second hammer drilling mode and a third chiselling mode.

8. The rotary hammer of claim 7 wherein the switch element further comprises:

a cam section acting at the coupling sleeve via the slider part to move the coupling sleeve between a position engaged with the drive sleeve and a release position separated from the drive sleeve.

9. The rotary hammer of claim 7 or 8 further comprising:

a coupling part coaxially movable relative to the drive shaft between a first and second positions engaging and disengaging, respectively, the drive connection between the armature shaft and the drive shaft; and an actuating section connected to the switching element eccentrically relative to the main axis for moving the coupling part between the first and second positions.

* * * * *